(12) United States Patent
Chen

(10) Patent No.: US 6,535,405 B2
(45) Date of Patent: Mar. 18, 2003

(54) POWER SUPPLY DEVICE HAVING TWO AC POWER INPUTS

(75) Inventor: Green Chen, Sanchung (TW)

(73) Assignee: I-Star Computer Co., Ltd., Taipei Hsien (TW)

( * ) Notice: Subject to any disclaimer, the term of this patent is extended or adjusted under 35 U.S.C. 154(b) by 0 days.

(21) Appl. No.: 09/855,417

(22) Filed: May 15, 2001

(65) Prior Publication Data

US 2002/0145894 A1 Oct. 10, 2002

(30) Foreign Application Priority Data

Apr. 4, 2001 (TW) ....................... 90205252 U

(51) Int. Cl.⁷ .............................. H02M 7/00
(52) U.S. Cl. ......................... 363/65; 307/87
(58) Field of Search ............... 363/65, 56, 72, 363/98, 97; 307/66, 87, 84, 85, 86

(56) References Cited

U.S. PATENT DOCUMENTS 4,473,756 A * 9/1984 Brigden et al. ............ 307/66
4,890,005 A * 12/1989 Schonack ................... 307/87

\* cited by examiner

*Primary Examiner*—Rajnikant B. Patel
(74) *Attorney, Agent, or Firm*—William E. Pelton, Esq.

(57) ABSTRACT

A power supply device having two AC power inputs includes a power unit that has first and second AC power inputs and a power output, a step-down and filter unit, a power regulator unit, and a detecting and switching unit. The step-down and filter unit converts the AC from the power unit to a low-voltage DC power. The power regulator unit maintains the low-voltage DC power as a stable power. The detecting and switching unit detects whether a power failure occurs on the first AC power input and subsequently switches the power supply to the second AC power input to keep a stable power supply so as to avoid any damage caused from the failure of the power supply.

3 Claims, 1 Drawing Sheet

POWER SUPPLY DEVICE HAVING TWO AC POWER INPUTS

BACKGROUND OF THE INVENTION

1. Field of the Invention

The present invention pertains to a power supply device, in particular, a power supply device having two AC power inputs, the power supply device being capable of choosing one of the two AC power inputs to be a power supply by determining the voltage level on the one of the two AC power inputs so as to maintain an uninterrupted power supply.

2. Description of Related Art

Most machine or instrument users would regard a power failure or unstable power supply as the most undesirable thing that could happen during the system operation, because it could cause severe damage to the system parts. In spite of the fact that a number of manufacturers claim that their uninterrupted power supply devices could protect users from possible power failure or unstable power supply conditions, most of these devices are based on the recharge-and-standby technology, which is hampered by the limited operating time of the device. Also, these power supply devices are designed with a single power input, but do not take into account what happens if the only power line experiences power failure or unstable power. As a result, a better solution is needed to deal with the above-mentioned problems, and that solution should be convenient to use and able to respond to the unstable power or power failure conditions.

To overcome these shortcomings, the present invention tends to provide a power supply device with two AC power inputs to mitigate and obviate the aforementioned problems.

SUMMARY OF THE INVENTION

The main object of the present invention is to provide a power supply device having two AC power inputs for giving a stable power supply, and when one of the two AC power inputs becomes unstable or cut off, the power supply device will automatically switch to the other AC power input thus preventing the problem of power interruption.

Other objects, advantages, and novel features of the invention will become more apparent from the following detailed description when taken in conjunction with the attached drawings.

DETAILED DESCRIPTION OF THE PREFERRED EMBODIMENT

Figure 1:
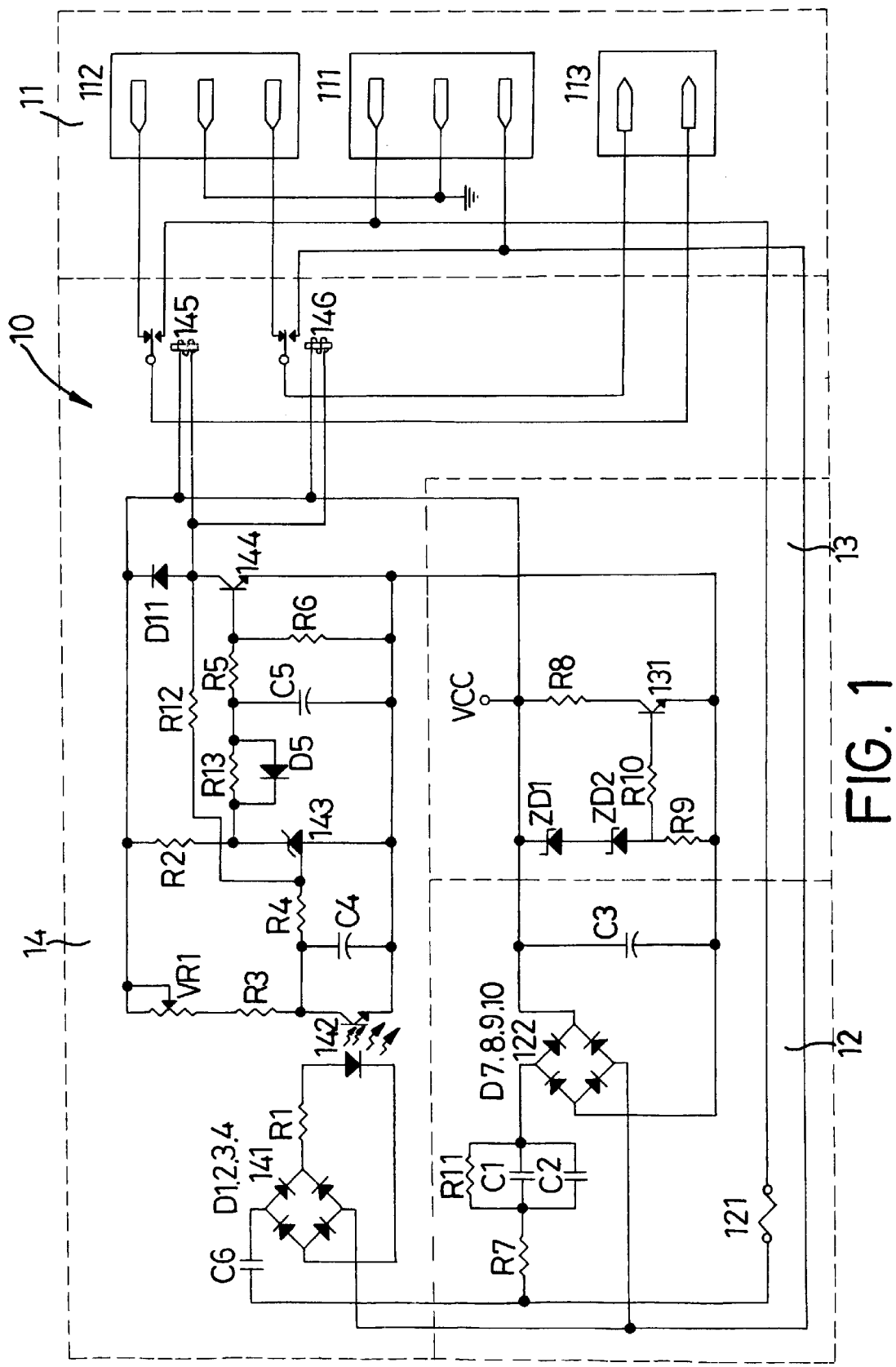
FIG. 1 is the schematic diagram of the invention.

With reference to FIG. 1, there is shown the detailed circuit of a power supply device under the invention, which is based on a power supply circuit (10). The power supply circuit (10) comprises a power unit (11), a step-down and filter unit (12), a power regulator unit (13) and a detecting and switching unit (14).

The power unit (11) has first and second AC power inputs (111, 112) and a power output (113). The step-down and filter unit (12) is to receive power from the first AC power input (111) and generate low-voltage DC power. The power regulator unit (13) is to provide a regulated power supply to the step-down and filter unit (12) to ensure stable power supply. The detecting and switching unit (14) is to detect the voltage level at the first AC power input (111) and switch the power output (113) connection between the first and the second AC power inputs (111, 112).

The step-down and filter unit (12) is formed with resistors R7, R11, capacitors C1, C2 and C3, and a first bridge rectifier (122). The input of the first bridge rectifier (122) is connected to a filter circuit formed with the resistors R7, R11 and capacitors C1, C2, and the output of the first bridge rectifier (122) is connected to the power regulator unit (13) via a capacitor (C3). The filter circuit receives power from the power unit (11) by connecting its input to the first AC power input (111) of the power unit (11) via a fuse (121).

The power regulator unit (13) is formed with two Zener diodes ZD1, ZD2, resistors R8, R9, and R10, and a transistor (131). The base of the transistor (131) is connected to the output of the first bridge rectifier (122) via the resistor R10 and the two series connected Zener diodes ZD1, ZD2, and the emitter of the transistor (131) is connected to the detecting and switching unit (14).

The detecting and switching unit (14) is formed with a second bridge rectifier (141), a photo coupler (142), a voltage level comparator (143), a transistor (144), and two relay switches (145, 146). The input to the second bridge rectifier (141) is connected to the input of the step-down and filter unit (12), and the output of the second bridge rectifier (141) is connected to the photo coupler (142) via a resistor RI. The gate of the voltage level comparator (143) is connected to the output of the photo coupler (142) via a resistor R4 and a capacitor C4, and the anode of the voltage level comparator (143) is connected to the base of the transistor (144). The collector of the transistor (144) is connected to the two relay switches (145, 146) respectively.

Each of the relay switches (145, 146) has a common end connected to the power output (113), and each of the relay switches (145, 146) has a normal-open end and a normal-closed end respectively linked to the first AC power input (111) and the second AC power input (112). Through the action of the two relay switches (145, 146) the power supply device will be able to select either one of the first and second AC power inputs (111, 112) for making a connection with the power output (113).

A detailed circuit analysis of the preferred embodiment is provided below for further insight into the design of the invention.

The step-down and filter unit (12) and the detecting and selecting unit (14) are powered by the first AC power input (111). The step-down and filter unit (12) is for rectifying and filtering AC power through the action of the first bridge rectifier (122), producing a low-voltage DC power, and transmitting the low-voltage DC power to the power regulator unit (13). When the voltage level of the low-voltage DC power is greater than the breakdown voltage of the two Zener diodes ZD1, ZD2, the transistor (131) will be activated and enabled to supply power to the detecting and switching unit (14). But when the voltage level of the low-voltage DC power is lower that the breakdown voltage of the two Zener diodes ZD 1, ZD2, the power supply will be cut off.

The detecting and switching unit (14) is for receiving AC power from the first AC power input (111), rectifying the AC power, transmitting the rectified AC power to the gate of the voltage level comparator (143) through the photo coupler (142), and for detecting the voltage level on the first AC power input (111) to determine whether it is high or low. If the voltage level on the first AC power input (111) is high, the high voltage will cause it to produce a low voltage at the output of the photo coupler (142), disabling the voltage level comparator (143), but enabling the transistor (144) to turn on due to a high voltage level at the base, thus causing the relay switches (145, 146) to be energized and each common end to be switched to each normal-open end for connecting the first AC power input (111) and the power output (113).

Conversely, if the voltage level on the first AC power input (111) is low, the low voltage will cause it to produce a high voltage at the output of the photo coupler (142), enabling the voltage level comparator (143), but disabling the transistor (114) due to a low voltage level at the base, thus causing the relay switches (145, 146) to be energized and each common end to be switched to the each normal-closed end for connecting the second AC power input (112) and the power output (113).

From the foregoing, it can be understood that the invention is capable of detecting voltage changes on the input voltage and switching to an alternate power input if required to avoid unstable power or power failure conditions, which could otherwise lead to severe damage of the user system.

It is to be understood, however, that even though numerous characteristics and advantages of the present invention have been set forth in the foregoing description, together with details of the method and function of the invention, the disclosure is illustrative only, and changes may be made in detail, within the principles of the invention to the full extent indicated by the broad general meaning of the terms in which the appended claims are expressed.

What is claimed is:

1. A power supply device having two AC power inputs, the power supply comprising:
    a power unit made up of a first AC pow output, a second AC power input and a power output;
    a step-down and filter unit connected to the power unit for receiving AC power from the first AC power input and generating a low-voltage DC power, wherein the step-down and filter unit comprises:
        a filter circuit formed with a plurality of resistors and a plurality of capacitors; and
        a first bridge rectifier having input and output terminals, the input terminals of the first bridge rectifier connected to the filter circuit, and the output terminals of the first bridge rectifier connected to the power regulator unit, where the filter circuit is connected to the first AC power input via fuse;
    a power regulator unit connected to the step-down and filter unit for regulating the low voltage DC power coming from the step-down and filter unit to ensure a stable power supply; and
    a detecting and switching unit connected to the first AC power input, the second AC power input and the power output for detecting the voltage level on the first AC power input, wherein when the voltage level on the first AC power input (111) is low, the detecting and switching unit switches the power output to connect to the second AC power input.

2. The power supply device having two AC power inputs as claimed in claim 1, wherein the power regulator unit comprises
    two series connected Zener diodes;
    a plurality of resistors; and
    a transistor having a base, emitter, and a collector, wherein the base of the transistor is connected to the output terminals of the first bridge rectifier via the resistor and the two series connected Zener diodes, and the emitter of the transistor is connected to the detecting and switching unit.

3. The power supply device having two AC power inputs as claimed in claim 2, wherein the detecting and switching unit comprises
    a second bridge rectifier having input and output terminals, the input terminals of the second bridge rectifier being connected to the first AC power unit for rectifying the power from the first AC power unit;
    a photo coupler connected to the output terminals of the second bridge rectifier;
    a voltage level comparator connected to the photo coupler for detecting output voltage of the photo coupler; and
    a transistor connected to the voltage level comparator and two relay switches, each relay switch having a common end connected to the power output, a normal-open end and a normal-closed end respectively linked to the first AC power input and the second AC power input, when the output voltage of the photo coupler is low, the transistor is activated and the first AC power input is connected to the power output, when the output voltage of the photo coupler is high, the transistor is disabled and the second AC power input is connected to the power output.

* * * * *